US011865805B2

(12) United States Patent
Henderson, Jr.

(10) Patent No.: US 11,865,805 B2
(45) Date of Patent: Jan. 9, 2024

(54) HAMMER TIPPING AND DE-TIPPING DEVICE

(71) Applicant: ROMP FASTENERS LLC, Las Vegas, NV (US)

(72) Inventor: Hollis C. Henderson, Jr., Lincolnton, NC (US)

(73) Assignee: ROMP FASTENERS LLC, Las Vegas, NV (US)

( * ) Notice: Subject to any disclaimer, the term of this patent is extended or adjusted under 35 U.S.C. 154(b) by 0 days.

(21) Appl. No.: 17/342,365

(22) Filed: Jun. 8, 2021

(65) Prior Publication Data

US 2022/0388265 A1 Dec. 8, 2022

(51) Int. Cl.

| | |
|---|---|
| ***B25B 11/00*** | (2006.01) |
| ***B30B 9/00*** | (2006.01) |
| ***B30B 15/06*** | (2006.01) |
| ***B30B 1/24*** | (2006.01) |
| *B25D 1/02* | (2006.01) |

(52) U.S. Cl.
CPC ................ *B30B 9/00* (2013.01); *B25B 11/00* (2013.01); *B30B 1/24* (2013.01); *B30B 15/062* (2013.01); *B25D 1/02* (2013.01)

(58) Field of Classification Search
CPC ........... B30B 9/00; B30B 1/24; B30B 15/062; B25B 11/00; B25D 1/02
USPC ......................................................... 29/426.5
See application file for complete search history.

(56) References Cited

U.S. PATENT DOCUMENTS

| | | | | | |
|---|---|---|---|---|---|
| 3,888,721 | A * | 6/1975 | Carmien | B25G 3/34 | 29/244 |
| 4,569,281 | A * | 2/1986 | Woods | B30B 9/321 | 100/103 |
| 4,899,430 | A * | 2/1990 | Farino | B25B 13/48 | 29/256 |
| 4,901,418 | A * | 2/1990 | Machado | A63B 53/02 | 29/266 |
| 5,320,001 | A * | 6/1994 | Floyd | B25G 3/28 | 81/23 |

* cited by examiner

*Primary Examiner* — Nirvana Deonauth
(74) *Attorney, Agent, or Firm* — Maschoff Brennan

(57) ABSTRACT

A mallet hammer tipping-detipping apparatus may include a press weldment. The press weldment may include a press base and a press neck extending from a surface of the press base. The mallet hammer tipping-detipping apparatus may include a press adapter coupled to the press neck. The press adapter may include a central recess such that a mallet hammer head may interface with the press adapter. The mallet hammer tipping-detipping apparatus may include a tip holder coupled to the base of the press weldment such that the press adapter is positioned above the tip holder. The tip holder may include a seating section in which the mallet hammer head may be positioned.

19 Claims, 12 Drawing Sheets

HAMMER TIPPING AND DE-TIPPING DEVICE

The present disclosure generally relates to a hammer tipping and detipping device.

BACKGROUND

A mallet hammer may include a handle and a head attached to an end of the handle. A mallet hammer head may include one or more mallet hammer caps. For example, the mallet hammer may include a first mallet hammer cap at a first end of the head having a circular cross-section and a second mallet hammer cap at a second end of the head having a rectangular cross-section. Mallet hammer caps may include various geometries and/or be made of various materials depending on a situation in which the mallet hammer may be used.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a mallet hammer tipping-detipping apparatus may include a press weldment. The press weldment may include a press base and a press neck extending from a surface of the press base. The mallet hammer tipping-detipping apparatus may include a press adapter coupled to the press neck. The press adapter may include a central recess such that a mallet hammer head may interface with the press adapter. The mallet hammer tipping-detipping apparatus may include a tip holder coupled to the base of the press weldment such that the press adapter is positioned above the tip holder. The tip holder may include a seating section in which the mallet hammer head may be positioned.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
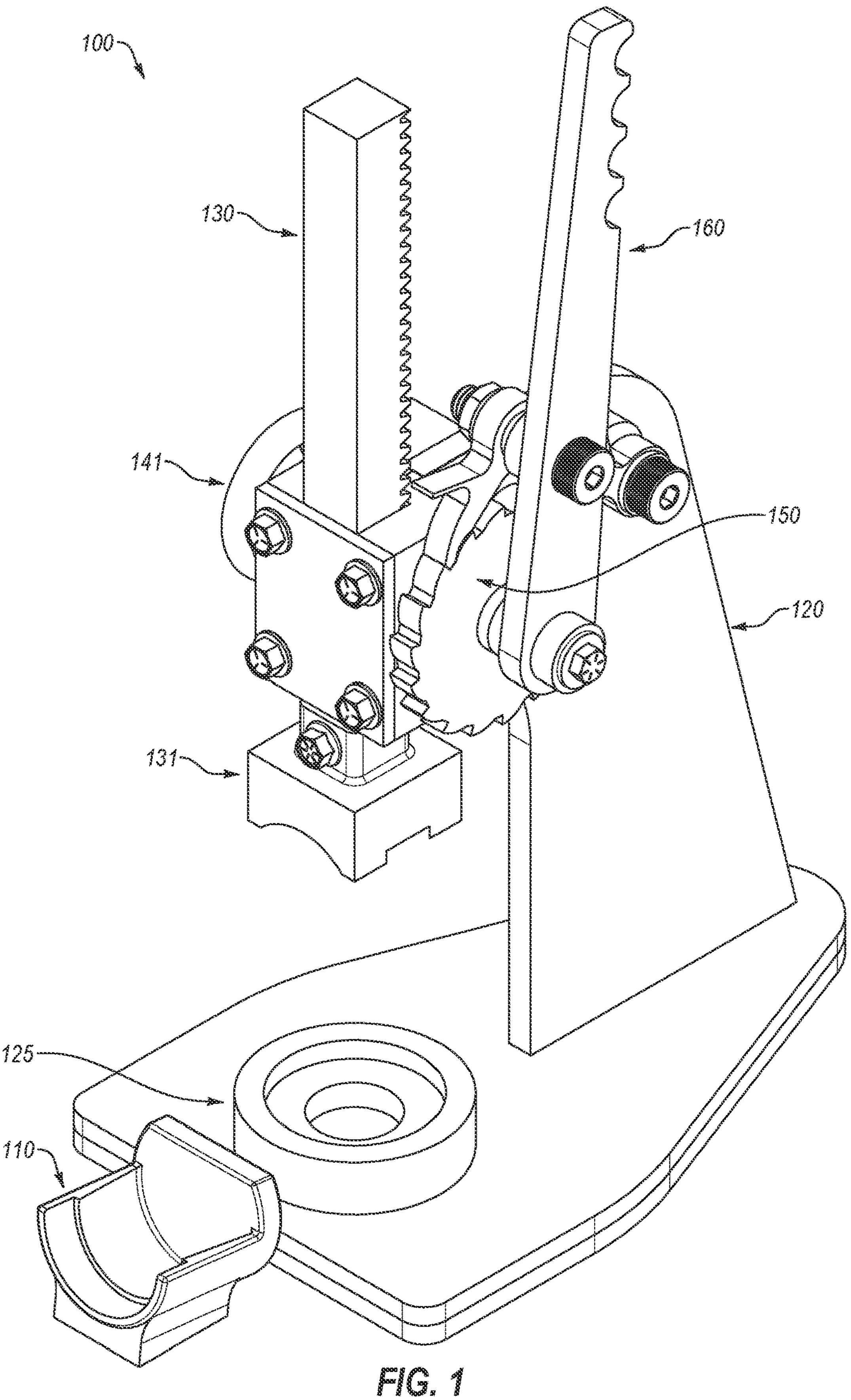
FIG. 1 is an example embodiment of a mallet hammer tipping-detipping apparatus according to the present disclosure.

A mallet hammer cap may be coupled to the mallet hammer head in various ways. A mallet hammer cap may be included as a continuous part of the hammer head by coupling the mallet hammer cap to the hammer head. Different mallet hammer caps may be more suitable for different applications. For example, a claw hammer including a first hammer cap at a first end of the claw hammer having a circular cross-section and a second hammer cap at a second end of the claw hammer having a tapered profile split in the middle of the second hammer cap may be effective in carpentry applications where the hammer is used to install and/or remove nails. As another example, a mallet including one or more mallet hammer caps having larger surface areas and/or softer materials such as rubber or wood may be effective in flooring installation, masonry, landscaping, machining, and/or food processing applications.

A user may use different hammers for different applications. However, it may be undesirable for the user to own and/or carry a hammer for each occasion. As such, a mallet hammer may include interchangeable tips attachable to one or both ends of an interchanging hammer head. Each of the interchangeable tips may include a first end capable of interfacing with the interchanging mallet hammer head and a second striking end. For example, a given interchanging mallet hammer head may include a hexagonal socket, and a given interchangeable tip may include a first hexagonal end capable of interfacing with the hexagonal socket of the given interchanging hammer head. A second end of the given interchangeable tip may include a large circular cross-section such that the given interchanging mallet hammer including the given interchangeable tip may function as a mallet.

Installation and/or removal of interchangeable tips may be difficult because the interchangeable tips may be used to strike surfaces and/or objects with high force. A method of installing an interchangeable tip to a mallet hammer head should securely fasten the interchangeable tip to the interchanging mallet hammer head such that the components are not damaged, marred, and/or dislodged during use. Existing methods of coupling the interchangeable tip to an interchanging hammer head may include using fitting rings, glue, threaded interfaces, etc. Such methods of securely fastening and/or removing an interchangeable tip may be time-consuming and/or may strip away over time.

The present disclosure relates to, among other things, a mallet hammer tipping-detipping apparatus. The hammer tipping-detipping apparatus may include a press weldment including a press base and a press neck extending from the press base. The press neck may be fixedly attached to the press base or the press neck and the press base may be a unitary structure made by casting, molding, etc. A tip holder may be mounted on the press base, and a press adapter may be mounted on the press neck such that the tip holder and the press adapter are vertically aligned. The press adapter may be coupled to a rack gear. The rack gear may be coupled to a spur gear such that rotation of the spur gear facilitates movement of the rack gear in a vertical direction. Vertical movement of the rack gear may affect a corresponding movement of the press adapter and allow the press adapter to clamp down on a hammer head positioned between the tip holder and the press adapter.

The mallet hammer tipping-detipping apparatus according to the present disclosure may provide a quick and efficient method of installing and/or removing interchangeable mallet hammer caps for mallet hammer heads. The mallet hammer tipping-detipping apparatus may facilitate installation and/or removal of any commercially available mallet hammer caps. Additionally or alternatively, the mallet hammer tipping-detipping apparatus may be modified to accommodate unconventional mallet caps. The mallet hammer cap may be installed on the mallet hammer head by placing the mallet hammer cap on the tip holder and positioning a first end of the mallet hammer head against the mallet hammer cap. Pressure may be applied to the press adapter at a second end of the mallet hammer head to connect the mallet hammer cap and the hammer head at the first end. The mallet hammer cap may be removed from the mallet hammer head by clamping the hammer cap between the tip holder and the press adapter. Pressure may be applied to a handle of the mallet hammer to disconnect the clamped mallet hammer cap from the mallet hammer head.

Embodiments of the present disclosure are explained with reference to the accompanying figures.

FIG. 1 is an example embodiment of the mallet hammer tipping-detipping apparatus 100 according to the present disclosure. The mallet hammer tipping-detipping apparatus 100 may include a tip holder 110, a press weldment 120, a cap disk 125, a rack gear 130, a press adapter 131, a wheel 141, a ratchet wheel 150, and a lever 160. The tip holder 110 may include a seating section in which a head of a hammer (not shown) may be positioned such that a first side of the hammer head interfaces with one or more surfaces of the tip holder 110. In some embodiments, the tip holder 110 may be positioned on a top surface of the press weldment 120 such that the tip holder 110 is aligned with the press adapter 131, and the seating section of the tip holder 110 faces the press adapter 131. The cap disk 125 may be positioned flush against the seating section of the tip holder 110 and may facilitate holding the mallet hammer head in place during installation of a hammer cap. In some embodiments, the cap disk 125 may include a recess such that the cap disk 125 may facilitate holding a double-sided mallet hammer head in place in the recess. A second side of the mallet hammer head may interface with the press adapter 131 such that the mallet hammer head is wedged between the tip holder 110 and the press adapter 131.

In some embodiments, the press adapter 131 may be attached to the rack gear 130, and a height of the press adapter 131 may be adjusted by vertically moving a position of the rack gear 130 relative to the rest of the mallet hammer tipping-detipping apparatus 100. In these and other embodiments, the wheel 141 may be coupled to a spur gear (not shown). Turning the wheel 141 may facilitate rotation of the spur gear and movement of the rack gear 130 in the direction of the rotation. In some embodiments, the wheel 141 may include a handlebar extending radially and/or axially from a rim of the wheel 141. The handlebar may provide users with a way to securely grip the wheel 141 and facilitate rotation of the wheel.

In some embodiments, the ratchet wheel 150 and/or the lever 160 may lock the positioning of the press adapter 131. The lever 160 may be fastened to the ratchet wheel 150 by the shoulder bolt 152 and the washer 154. Rotation of the lever 160 may lock a positioning of the ratchet stop 151 against one or more teeth of the ratchet wheel 150. Because the ratchet wheel 150 and/or the lever 160 are fastened to the rack block including the spur gear 144 and the rack gear 130, rotation of the spur gear 144 and movement of the associated press adapter 131 may be prevented by locking the ratchet wheel 150. Additionally or alternatively, the ratchet wheel 150 and/or the lever 160 may be replaced by and/or used alongside another mechanism for locking the positioning of the press adapter 131. For example, a threaded knob, a deadbolt, a pin, etc. may be included to lock positioning of the press adapter 131 at a specified height relative to a base of the press weldment 120. As another example, the ratchet wheel 150 and/or the lever 160 may be replaced by a pneumatic locking mechanism, a hydraulic locking mechanism, and/or a magnetic locking mechanism.

In some embodiments, components of the hammer tipping-detipping apparatus 100 may be made of one or more metals and/or metal alloys. Some components of the mallet hammer tipping-detipping apparatus 100 including detailed geometries, such as the tip holder 110, the cap disk 125, and/or the press adapter 131 may be made of plastic (e.g., polycarbonate, low-density polyethylene, polypropylene, etc.), other synthetic material, aluminum, stainless steel, cast and/or ductile steel, titanium, etc. In these and other embodiments, the components of the hammer tipping-detipping apparatus 100 including detailed geometries may be manufactured via laser-cutting, casting, extruding, etc. the material to produce the specified geometries of the components. Additionally or alternatively, components of the mallet hammer tipping-detipping apparatus 100, such as the press weldment 120, the ratchet wheel 150, the lever 160, and/or the rack gear 130, may be made of one or more metals and/or metal alloys having high compressive strength such as brass, bronze, silicon bronze, cast iron, etc. by casting, molding, extruding, etc.

Figure 2:
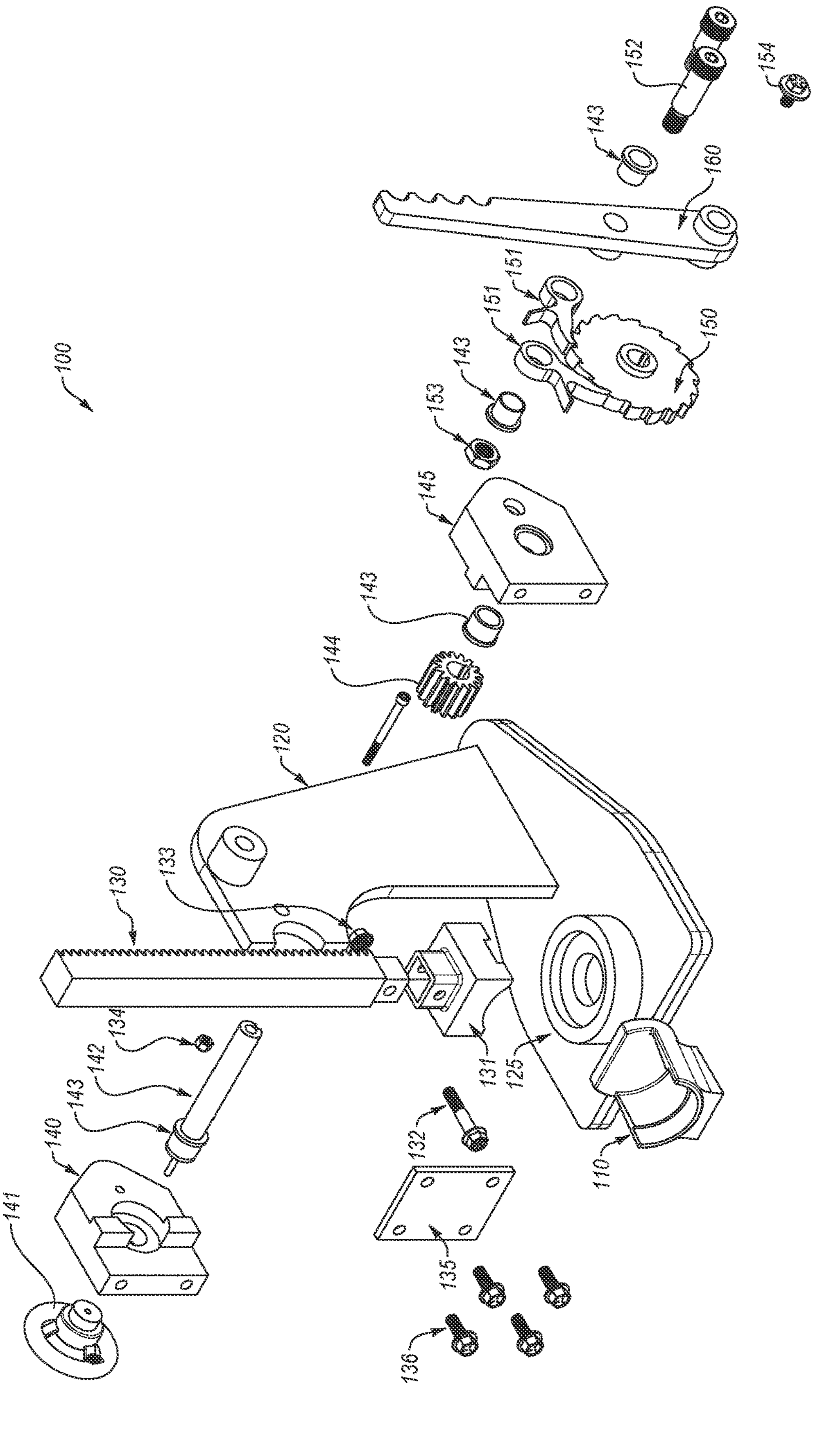
FIG. 2 is an exploded view of the example embodiment of the hammer tipping-detipping apparatus according to the present disclosure.

FIG. 2 is an exploded view of the example embodiment of the hammer tipping-detipping apparatus 100 according to the present disclosure. The hammer tipping-detipping apparatus 100 may include the tip holder 110, the press weldment 120, the cap disk 125, the rack gear 130, the press adapter 131, the wheel 141, the ratchet wheel 150, and the lever 160 as illustrated in FIG. 1. Additionally or alternatively, the exploded view of the mallet hammer tipping-detipping apparatus 100 may illustrate one or more bolts 132, one or more hex bolts 133, one or more nuts 134, a bearing-cap plate 135, one or more hex nuts 136, a first rack block section 140, a shaft 142, one or more bushings 143, a spur gear 144, a second rack block section 145, one or more ratchet stops 151, one or more shoulder bolts 152, one or more low-profile nuts 153, and one or more washers 154.

In some embodiments, a height of the press adapter 131 may be adjusted such that the mallet hammer tipping-detipping apparatus 100 may be fitted to hammers having heads of different lengths. Adjustment of the height of the press adapter 131 may be facilitated by the wheel 141, which may be coupled to the press adapter 131 by a rack gear 130. Rotation of the wheel 141 may affect rotation of the spur gear 144, which may cause movement of the rack gear 130 in the direction of the rotation. The rack block may include the first rack block section 140 and a second rack block section 145 between which the rack gear 130 and the spur gear 144 may be interposed. In these and other embodiments, the first rack block section 140 may be coupled to the second rack block section 145 via a shaft 142 including one or more bushings 143. An axle may protrude from a first end of the shaft 142 and extend through the first rack block section 140 such that the axle interfaces with the wheel 141 and provide an axis of rotation for the wheel 141. In some embodiments, a bushing 143 may be placed at the first end of the shaft 142 to mitigate vibrations from rotation of the wheel 141. The shaft 142 may extend through the spur gear 144 such that the location of the spur gear 144 is fixed, and the spur gear 144 may rotate to facilitate movement of the rack gear 130. A second end of the shaft 142 may be coupled to the second rack block section 145 by another bushing 143.

In some embodiments, the press adapter 131 may be coupled to the rack gear 130 by a bolt 132. The press adapter 131 may include a hollow section that may interface with an end of the rack gear 130. The hollow section of the press adapter 131 may include one or more edges defining the hollow section. The press adapter 131 may include an opening in the one or more edges of the hollow section. The end of the rack gear 130 that may interface with the press adapter 131 may include an opening corresponding to the opening in the hollow section of the press adapter 131 such that the bolt 132 may extend through both openings to fasten the press adapter 131 to the rack gear 130.

Additionally or alternatively, the bearing-cap plate 135 may be coupled to the rack gear 130 and the press adapter 131 to protect moving components of the hammer tipping-detipping apparatus 100, such as the rack gear 130, the spur gear 144, etc. The bearing-cap plate 135 may be fastened to the rack gear 130 by the one or more hex bolts 133, the one or more nuts 134, and the one or more hex nuts 136. In some embodiments, the bearing-cap plate 135 may interface with the first rack block section 140 and the second rack block section 145. The first rack block section 140 and the second rack block section 145 may include one or more openings, and the bearing-cap plate 135 may include one or more openings corresponding to the openings of the first rack block section 140 and the second rack block section 145. Each of the one or more hex nuts 136 may extend through the openings of the bearing-cap plate 135 and the openings of the first rack block section 140 or the second rack block section 145 to secure the bearing-cap plate 135 to the rack gear 130. In these and other embodiments, the rack gear 130 may be interposed between the first rack block section 140 at a first side, the second rack block section 145 at a second side opposite to the first side, and the bearing-cap plate 135 at a third side perpendicular to the first side and the second side.

In some embodiments, the ratchet wheel 150 and/or the lever 160 may be fastened to the second rack block section 145 by the shoulder bolts 152. The shoulder bolts 152 may be secured by the low-profile nut 153 to the second rack block section 145, and the ratchet wheel 150 and/or the lever 160 may be interposed between the low-profile nut 153 and one or more heads of the shoulder bolts 152. The shoulder bolts 152 may include one or more bushings 143 positioned along the length of the shoulder bolts 152. For example, a first bushing may be interposed between the low-profile nut 153 and the ratchet stop 151, and a second bushing may be interposed between the lever 160 and the head of the shoulder bolts 152.

Figure 3:
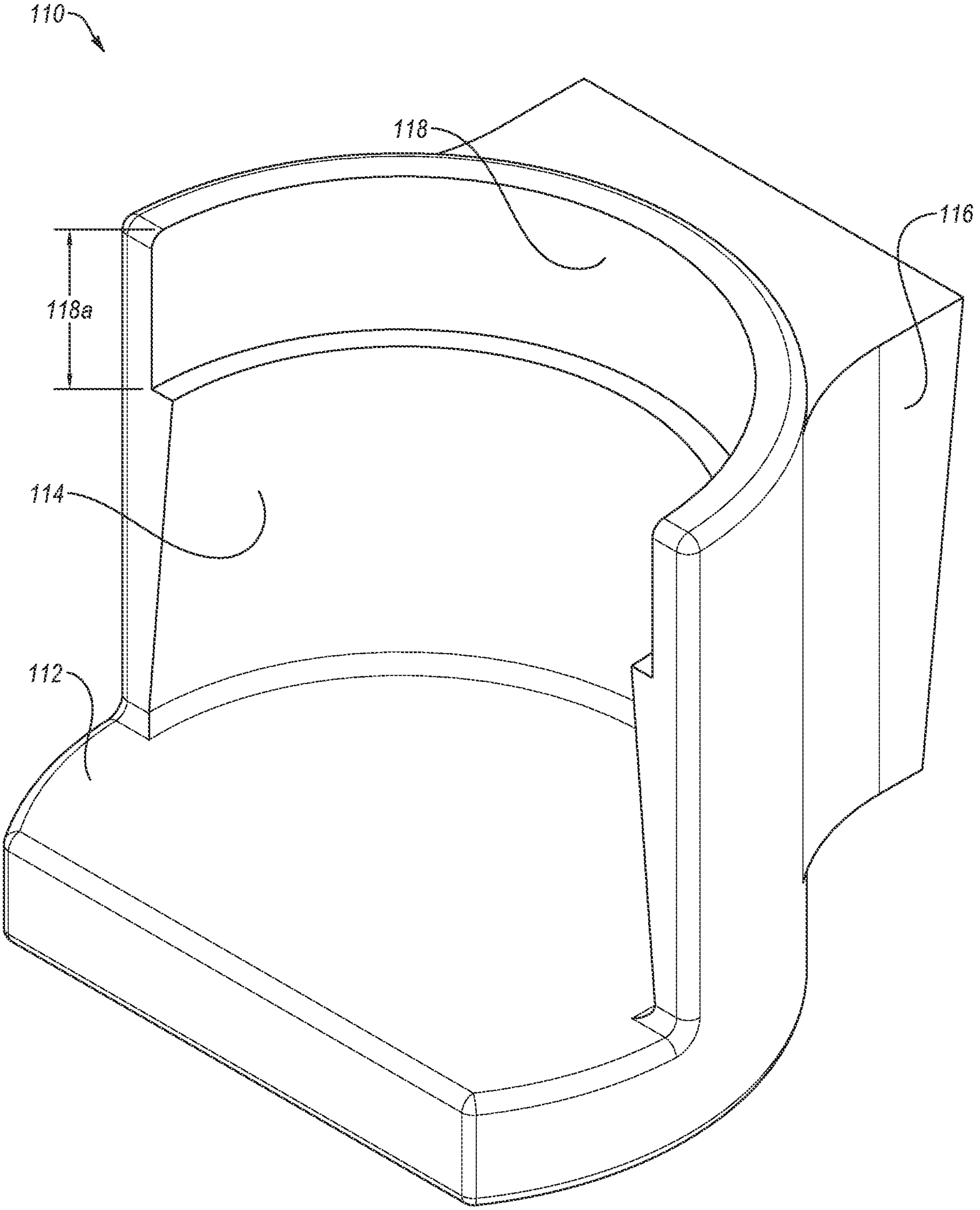
FIG. 3 is a close-up view of a tip holder according to the present disclosure.

FIG. 3 is a close-up view of the tip holder 110 according to the present disclosure. The tip holder 110 may include a seating section defined by a first seating section 112 and a second seating section 114. The first seating section 112 may include a flat or substantially flat surface upon which a flat or substantially flat surface of the mallet hammer head may be placed. A second surface of the mallet hammer head may be placed flush against the second seating section 114. As such, the second seating section 114 may include a curved profile like a hollow semi-cylinder to accommodate the shape of the mallet hammer head. Additionally or alternatively, the second seating section 114 may include any other profile, such as semi-conical, semi-rectangular prism, semi-hexagonal prism, cylindrical, rectangular prism, etc., to accommodate the shape of the mallet hammer head. In some embodiments, the second seating section 114 may include a relief cut-out section 118. The relief cut-out section 118 may include a thinner wall relative to a wall of the second seating section 114. Some mallet hammer heads may include mallet (retaining) hammer head rings for facilitating connection of the mallet hammer head and the mallet hammer cap. The relief cut-out section 118 may provide a surface upon which such mallet hammer head rings may rest and align positioning of the mallet hammer head ring between the mallet hammer head and the mallet hammer cap. The relief cut-out section 118 may include a height **118*a* that facilitates proper installation of the mallet hammer head ring. In these and other embodiments, the height 118*a*** may be deep enough to allow compression of the mallet hammer cap without bottoming the hammer head ring into the hammer cap and/or the hammer head.

In some embodiments, the tip holder 110 may include a base block 116. In these and other embodiments, the base block 116 may include a bottom surface that is inclined such that the tip holder 110 may be tilted at an angle when the bottom surface of the tip holder 110 is positioned flush against the press base 121. The tip holder 110 may be positioned such that the seating section of the tip holder 110 is oriented in a vertical direction relative to the press weldment 120 or in a horizontal direction relative to the press weldment 120. Orienting the seating section of the tip holder 110 in a vertical direction may be facilitated by positioning a bottom surface of the first seating section 112 flush against the press base 121. Orienting the seating section of the tip holder 110 in a horizontal direction may be facilitated by positioning a bottom surface of the base block 116 flush against the press base 121. The hammer head may be positioned in the seating section of the tip holder 110 such that a handle of the hammer extends in the horizontal direction when the tip holder 110 is oriented in the vertical direction. Additionally or alternatively, the hammer head may be positioned in the seating section of the tip holder 110 such that a handle of the hammer extends in the vertical direction when the tip holder 110 is oriented in the horizontal direction. Because of the angled bottom surface of the base block 116, the handle of the hammer may not be positioned perpendicular relative to the plane of the press base 121 and/or parallel relative to the direction in which the press neck 122 extends when the bottom surface of the base block 116 is positioned flush against the press base 121. In some embodiments, the base block 116 and/or the first seating section 112 may include a protrusion that may interface with a channel in the press base 121 to secure the tip holder 110 to the press base 121 as described in further detail below in relation to FIGS. 5C and 5D.

The geometries of the first seating section 112, the second seating section 114, and/or the base block 116 may facilitate installing a tip and/or uninstalling the tip of the mallet hammer head. In some embodiments, the tip of the mallet hammer head may be installed by positioning the first seating section 112 flush against the press base 121 and positioning the mallet hammer head in the seating section of the tip holder 110 such that a base of the mallet hammer head is positioned against the first seating section 112 and a lateral surface of the mallet hammer head is positioned against the second seating section 114. In these and other embodiments, the mallet hammer head may be oriented vertically such that the press adapter 131 may install the tip on the mallet hammer head as described in further detail below in relation to FIG. 4. Additionally or alternatively, the base block 116 may be positioned flush against the press base 121 The mallet hammer head may be positioned in the seating section of the tip holder 110 such that the lateral surface of the mallet hammer head is positioned against the horizontally oriented second seating section 114, and the base of the mallet hammer head is positioned against the vertically oriented first seating section 112. In these and other embodiments, the hammer may be oriented at an angle corresponding to the incline of the base block 116 such that the press adapter 131 may clamp the hammer head in the angled orientation for uninstallation of the tip of the hammer head.

Figure 4:
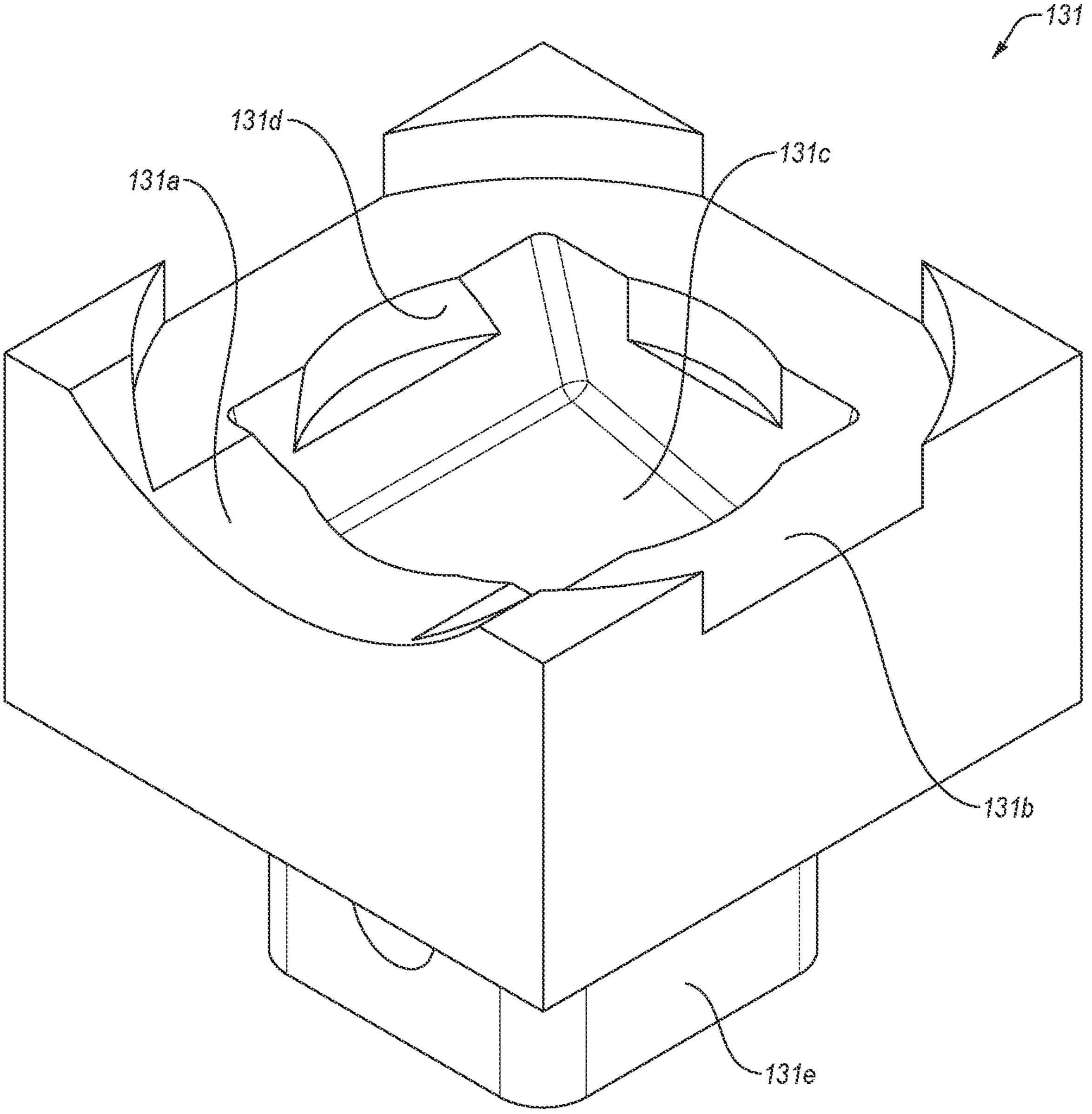
FIG. 4 is a close-up view of a press adapter according to the present disclosure.

FIG. 4 is a close-up view of the press adapter 131 according to the present disclosure. The press adapter 131 may include one or more edges 131*a* including a curved profile, one or more edges 131*b* including a straight profile, a central recess 131*c*, and a hollow base section 131*e*. In some embodiments, the curved-profile edge 131*a* and/or the straight-profile edge 131*b* may include an indentation in a middle of the edge to define the profile of the edge. For example, the curved-profile edge 131*a* may include a concave curved indentation in the middle of the edge, and the straight-profile edge 131*b* may include a straight-edged indentation in the middle of the edge as depicted in the close-up view of the press adapter 131. The press adapter 131 may facilitate installation and/or uninstallation of the tip of the mallet hammer head based on whether the hammer head interfaces with the curved-profile edge 131*a* and/or the straight-profile edge 131*b*. In some embodiments, the central recess 131*c* may facilitate installation and/or uninstallation of tips on various mallet hammer heads. Because not all mallet hammer heads include the same geometries, the central recess 131*c* may provide a more secure grip on mallet hammer heads including geometries that do not interface with the one or more edges 131*a* and 131*b*. In some embodiments, the central recess 131*c* may include one or more indents 131*d*. The one or more indents 131*d* may provide a surface upon which double-capped mallet hammer heads may securely rest. The hollow base section 131*e* may interface with the rack gear 130 as described above in FIG. 2.

Figure 5A:
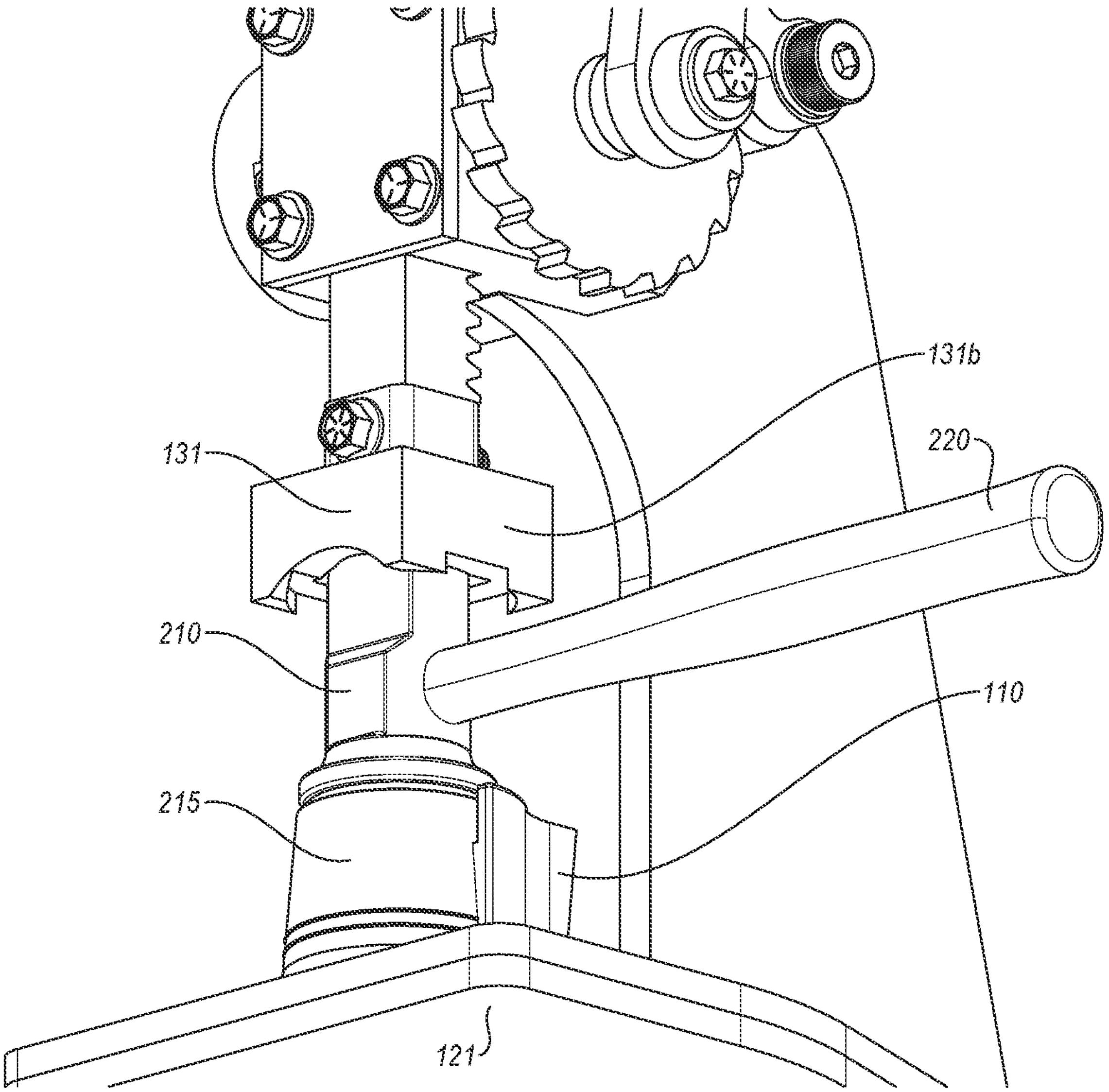
FIG. 5A illustrates installation of a tip of a mallet hammer head according to the present disclosure.

FIG. 5A illustrates installation of the mallet hammer cap 215 of a hammer head 210 according to the present disclosure. In some embodiments, installation of the mallet hammer cap 215 of the mallet hammer head 210 may be facilitated by placing the mallet hammer cap 215 in the seating section of the tip holder 110 and positioning the mallet hammer head flush against a top surface of the mallet hammer cap 215. A handle 220 of the mallet hammer may be oriented such that the handle 220 is parallel to the press base 121. The press adapter 131 may clamp the mallet hammer head 210 against the mallet hammer cap 215 such that the mallet hammer head 210 is interposed between the mallet hammer cap 215 and the press adapter 131. The straight-profile edge 131*b* may be aligned in the direction of the handle 220 of the mallet hammer to provide a secure grip on the mallet hammer head 210 and prevent rotation of the handle 220 during installation of the mallet hammer cap 215. Force may be applied to the mallet hammer head 210 by the clamping movement of press adapter 131 to install the mallet hammer cap 215 to the mallet hammer head 210.

Figure 5B:
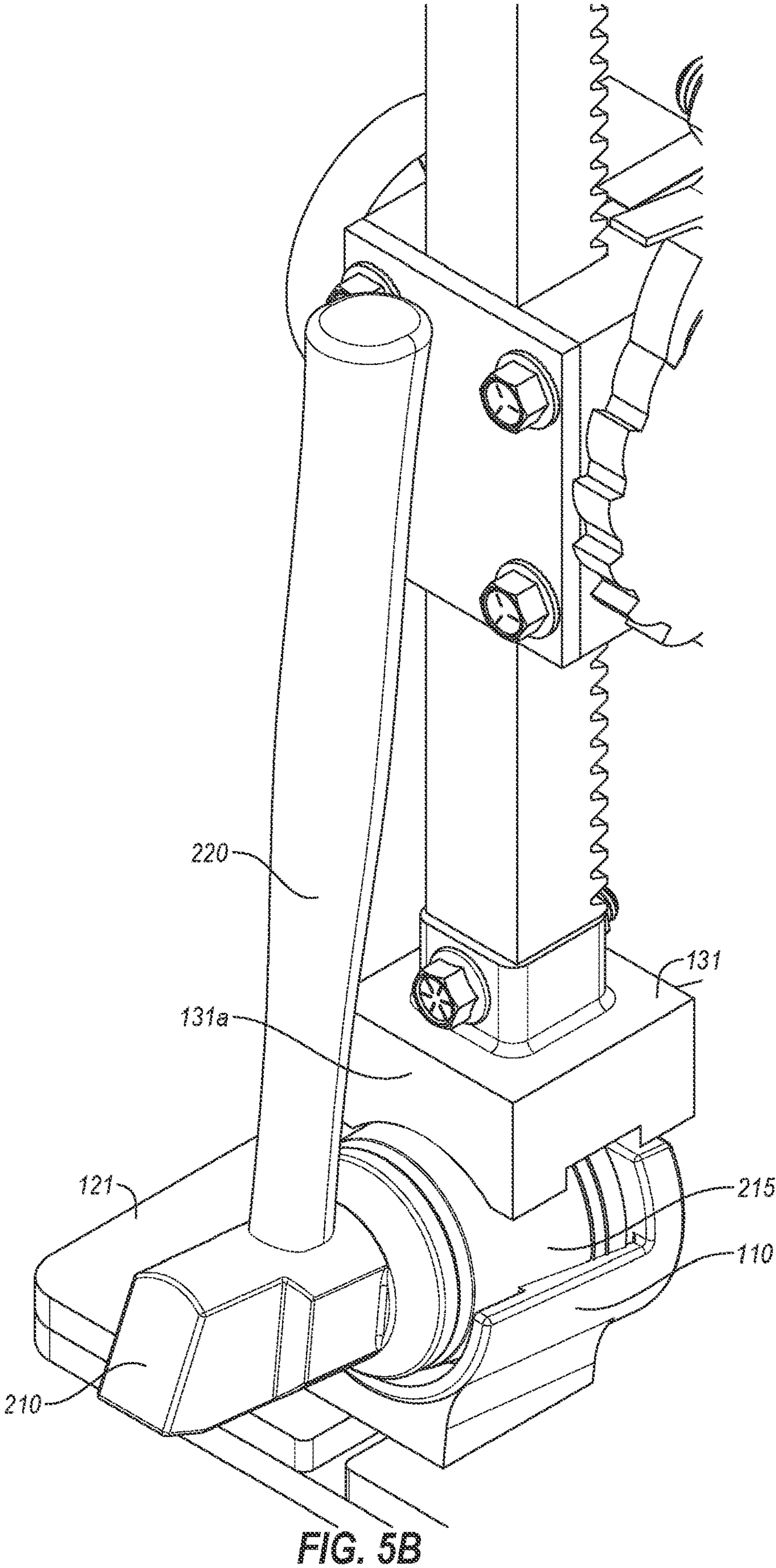
FIG. 5B illustrates uninstallation of the tip of the mallet hammer head according to the present disclosure.

FIG. 5B illustrates uninstallation of the mallet hammer cap 215 of the mallet hammer head 210 according to the present disclosure. In some embodiments, the tip holder 110 may be positioned on the press base 121 such that the second seating surface extends in the direction of the plane of the press base 121 at an inclined angle, and the first seating surface extends in a direction perpendicular to or substantially perpendicular to the second seating surface. Uninstallation of the mallet hammer cap 215 may be facilitated by placing the mallet hammer head 210 including the mallet hammer cap 215 in the seating section of the tip holder 110 such that the handle 220 extends in the same direction as the first seating surface of the tip holder 110. The mallet hammer cap 215 may be clamped by the press adapter 131 and the curved-profile edge 131*a*. Force may be applied to the handle 220 to dislodge the mallet hammer cap 215 clamped by the press adapter 131 and the curved-profile edge 131*a*.

Figure 5C:
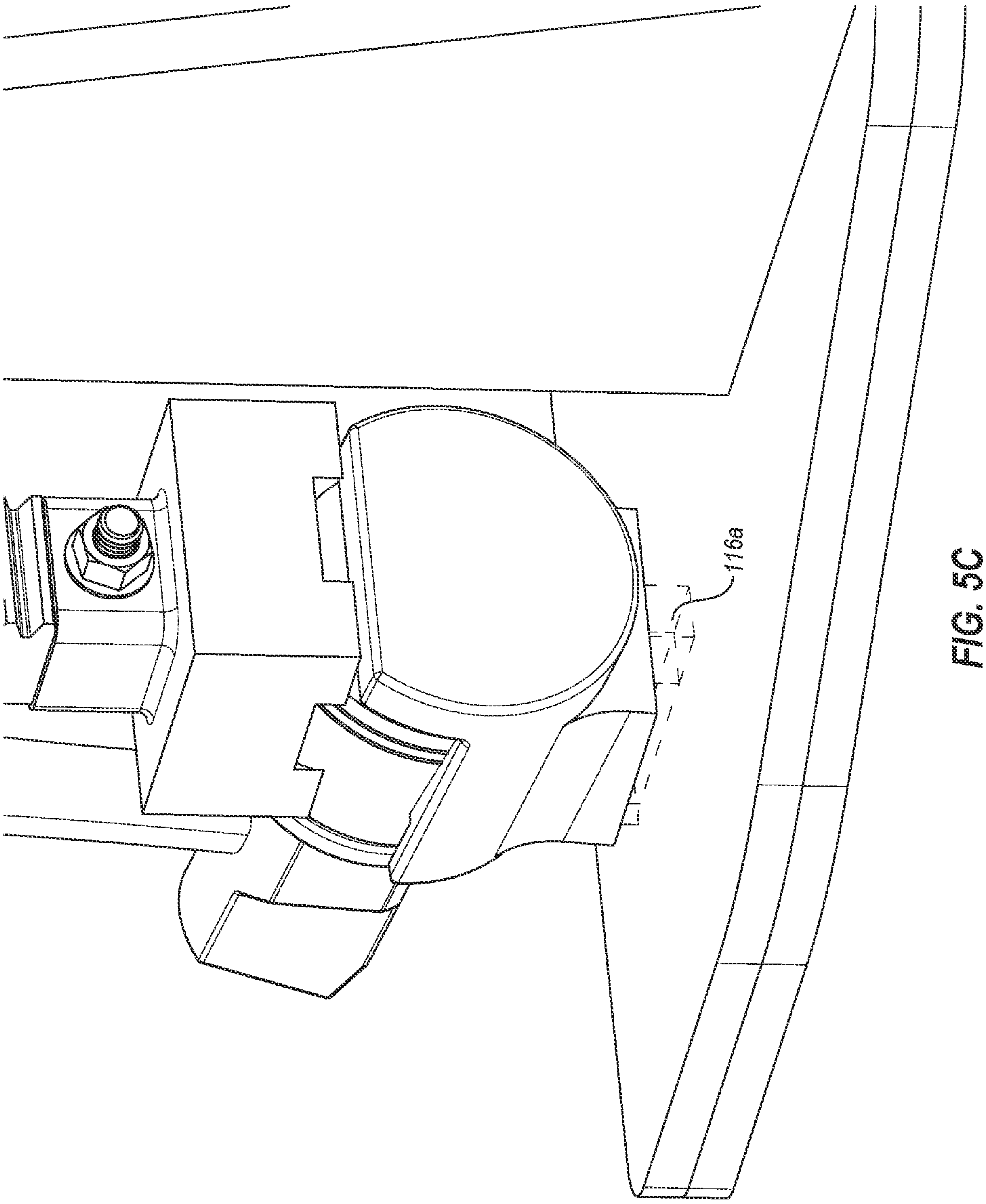
FIGS. 5C and 5D illustrate close-up views of a tip holder and a press base.
Figure 5D:
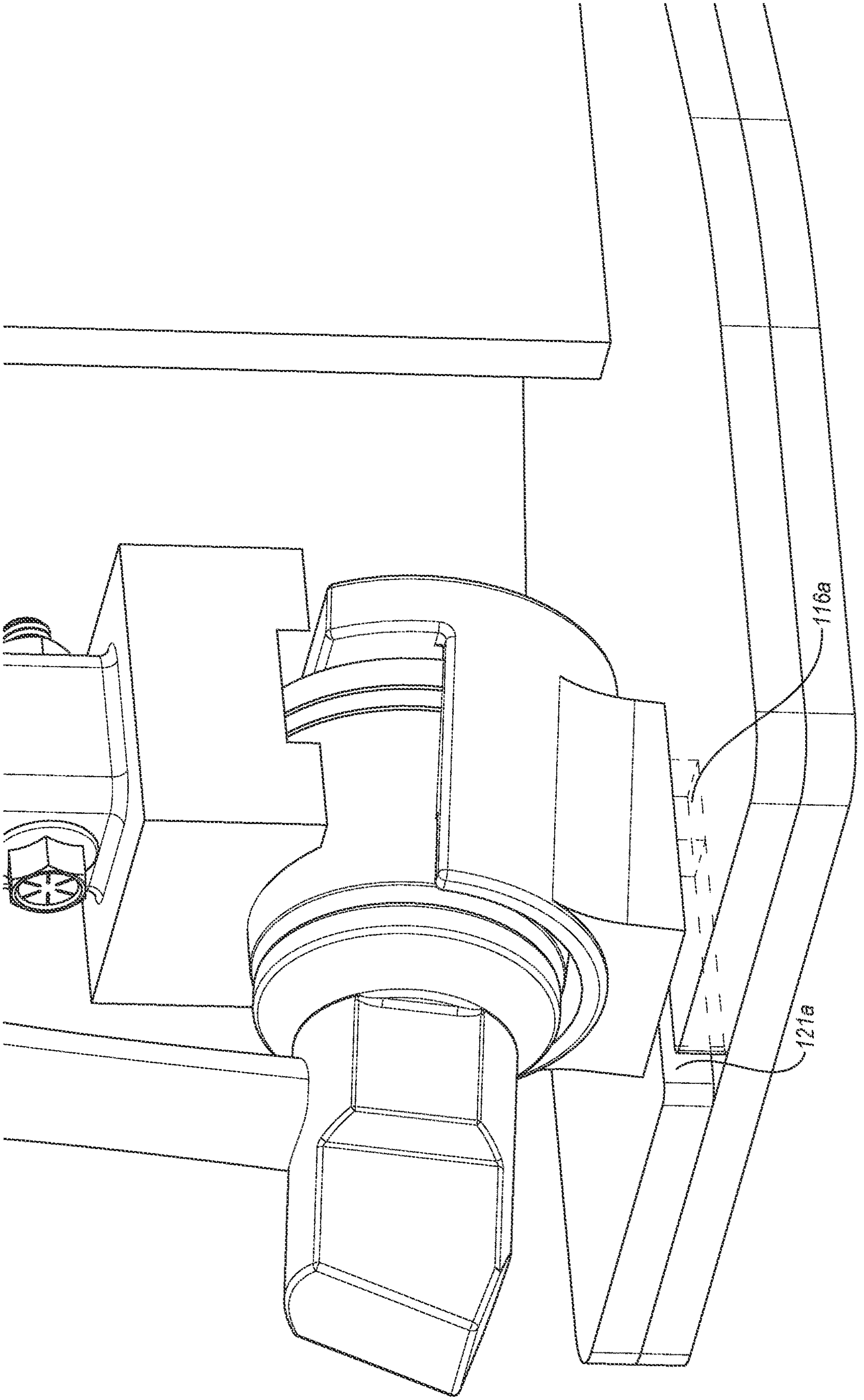

FIGS. 5C and 5D illustrate close-up views of the tip holder 110 and the press base 121 including a protrusion 116*a* attached to the tip holder 110 and a channel 121*a* in the press base 121 according to the present disclosure. In some embodiments, the tip holder 110 may include a protrusion 116*a* attached to the base block 116. Additionally or alternatively, the protrusion 116*a* may be attached to the bottom surface of the first seating section 112. The protrusion 116*a* may be shaped to interface with the channel 121*a* in the press base 121. For example, a given protrusion may include a rectangular prism shape, and a given channel may include a corresponding rectangular prism shape. In this example, the given protrusion may include a width and a height corresponding to a width and a depth of the channel such that the given protrusion may interface with the channel and prevent lateral movement of a given tip holder to which the given protrusion is attached. In some embodiments, the protrusion 116*a* may include notches, grooves, indentations, etc., and the channel 121*a* may include corresponding notches, grooves, indentations, etc. such that vertical movement of the tip holder 110 may be prevented responsive to the protrusion 116*a* interfacing with the channel 121*a*.

Figure 6:
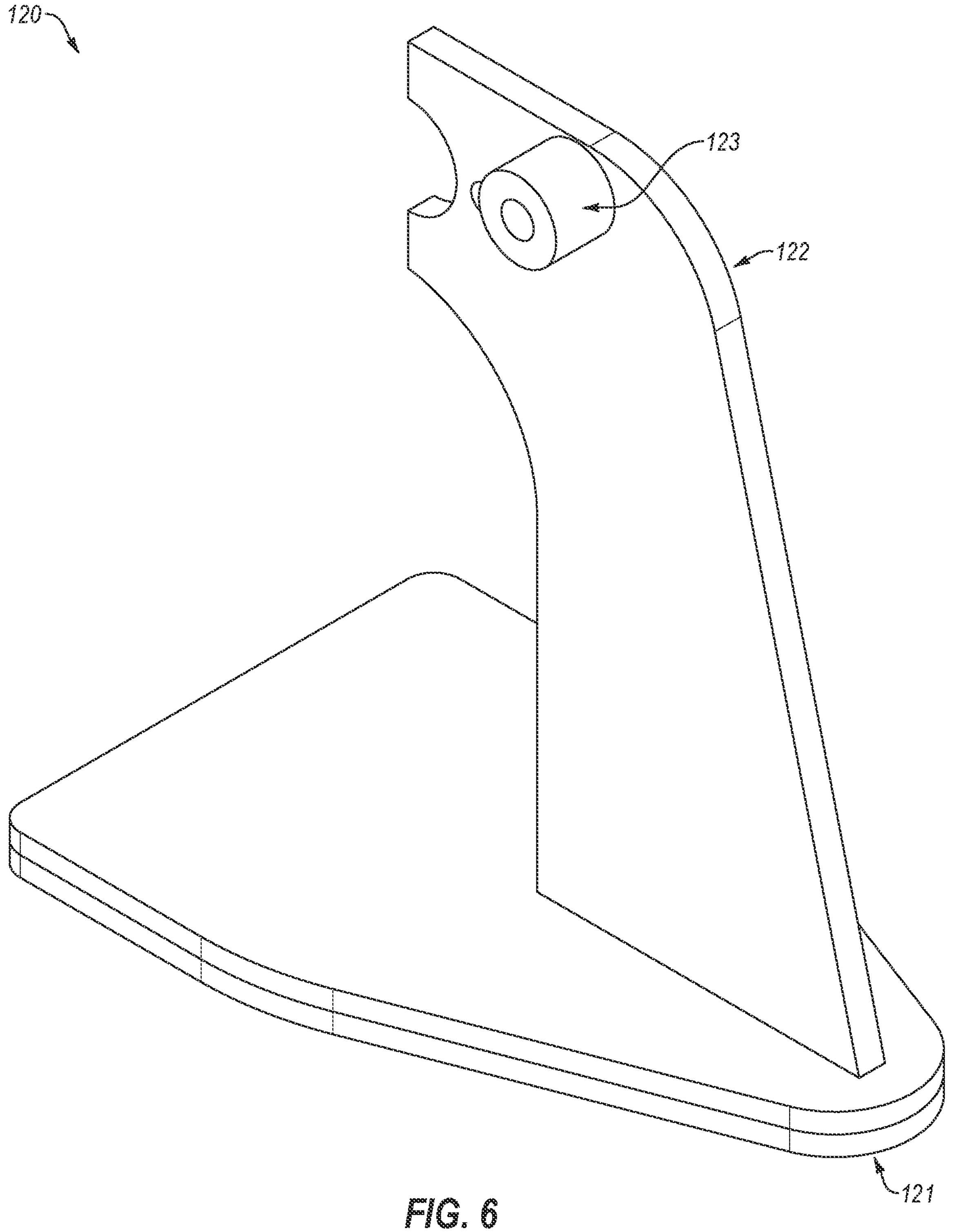
FIG. 6 is a close-up view of a press weldment according to the present disclosure.

FIG. 6 is a close-up view of the press weldment 120 according to the present disclosure. The press weldment 120 may include a press base 121, a press neck 122, and a strut reinforcement 123. The press base 121 may include a flat or substantially flat base member on which elements of the mallet hammer tipping-detipping apparatus 100 may be placed. For example, the tip holder 110 and/or the mallet hammer cap 215 may be placed flush against the press base 121. In some embodiments, the press base 121 may include a channel as described above in relation to FIGS. 5C and 5D. In these and other embodiments, the tip holder 110 and/or the mallet hammer cap 215 may include a protrusion extending from a bottom surface of the tip holder 110 and/or the mallet hammer cap 215. The protrusion may interface with the channel in the press base 121 such that the tip holder 110 and/or the mallet hammer cap 215 may slide along a top surface of the press base 121 along the path of the channel. The tip holder 110 and/or the mallet hammer cap 215 may be secured when the protrusion slides to the end of the channel such that the tip holder 110 and/or the mallet hammer cap 215 does not move during tipping and/or detipping of the mallet hammer head.

In some embodiments, the press neck 122 may extend from the press base 121. The press neck 122 may extend in a direction perpendicular to or substantially perpendicular to the press base. A profile of the press neck 122 may include an indented portion at an elevated end of the press neck 122 such that elements of the mallet hammer tipping-detipping apparatus 100 may more readily interface with the press neck 122. In these and other embodiments, the press neck 122 may include a strut reinforcement 123 at the elevated end of the press neck 122. The strut reinforcement 123 may reduce stress on the elevated end of the press neck 122 resulting from the weight of elements mounted on the elevated end of the press neck 122, such as the rack gear 130, the press adapter 131, the ratchet wheel 150, etc.

Figure 7A:
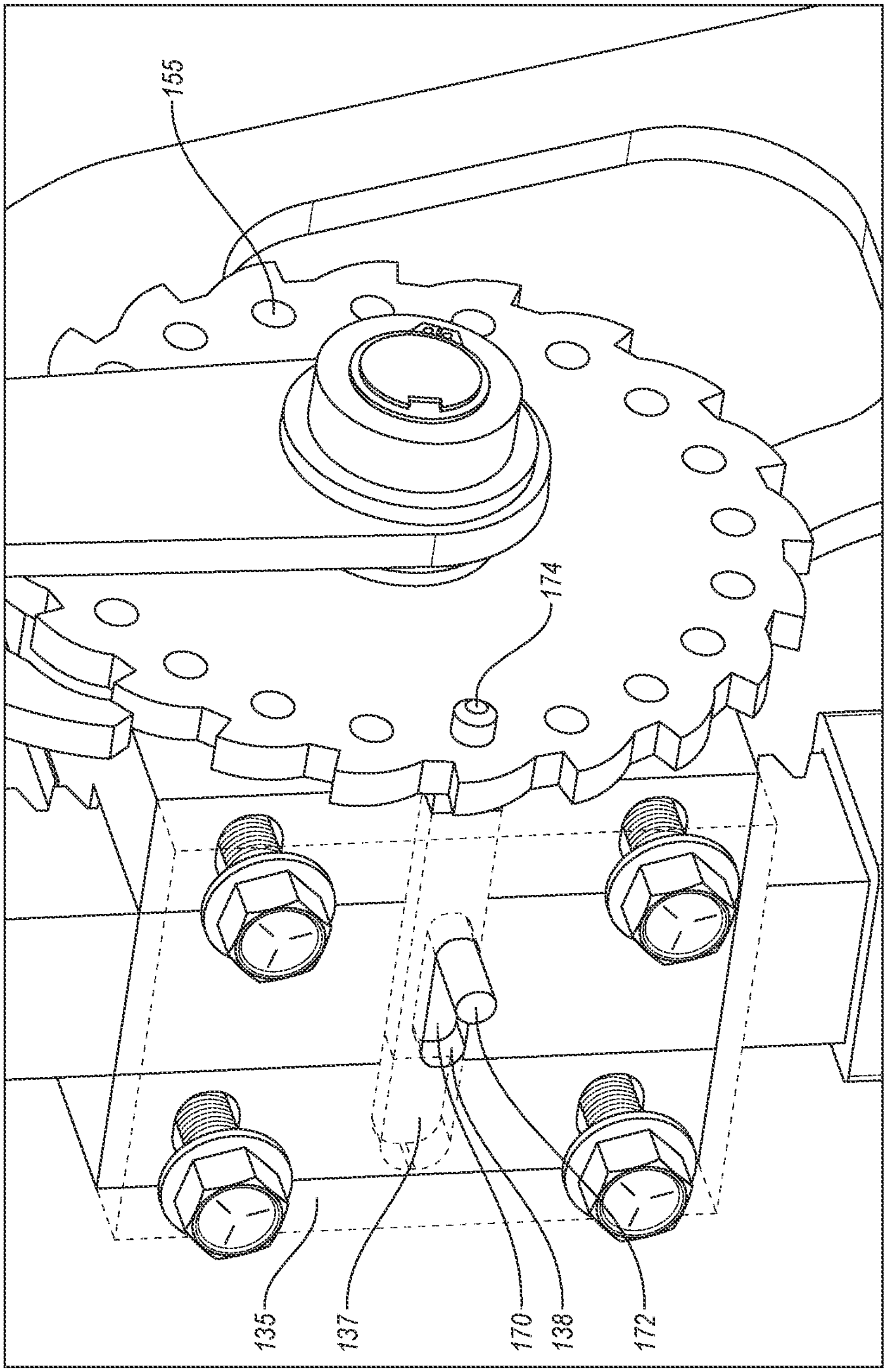
FIG. 7A illustrates a locking pin for locking the position of a ratchet wheel of the mallet hammer tipping-detipping apparatus.

FIG. 7A illustrates a locking pin 170 for locking the position of the ratchet wheel 150 of the mallet hammer tipping-detipping apparatus 100. In some embodiments, the bearing-cap plate 135 may include a channel 137 in which the locking pin 170 may be positioned. The locking pin 170 may include a first locking arm 172 extending radially from the locking pin 170 and a second locking arm 174 extending axially from an end of the locking pin 170. The first locking arm 172 may extend through a bearing-cap opening 138 in the bearing-cap plate 135 such that the locking pin 170 may slide along the length of the channel 137 corresponding to movement of the first locking arm 172 in the bearing-cap opening 138.

In some embodiments, the ratchet wheel 150 may include one or more ratchet wheel openings 155 perforating the surface of the ratchet wheel 150. In these and other embodiments, the second locking arm 174 may extend into and/or through one of the ratchet wheel openings 155 of the ratchet wheel 150 ("engaging" the locking pin 170). Engaging the locking pin 170 may prevent rotation of the ratchet wheel 150 and lock the position of the ratchet wheel 150. In these and other embodiments, sliding the first locking arm 172 such that the first locking arm 172 is positioned against a first end of the bearing-cap opening 138 may disengage the locking pin 170 and allow rotation of the ratchet wheel 150. Additionally or alternatively, sliding the first locking arm 172 such that the first locking arm 172 is positioned against a second end of the bearing-cap opening 138 may engage the locking pin 170 and lock rotation of the ratchet wheel 150.

Figure 7B:
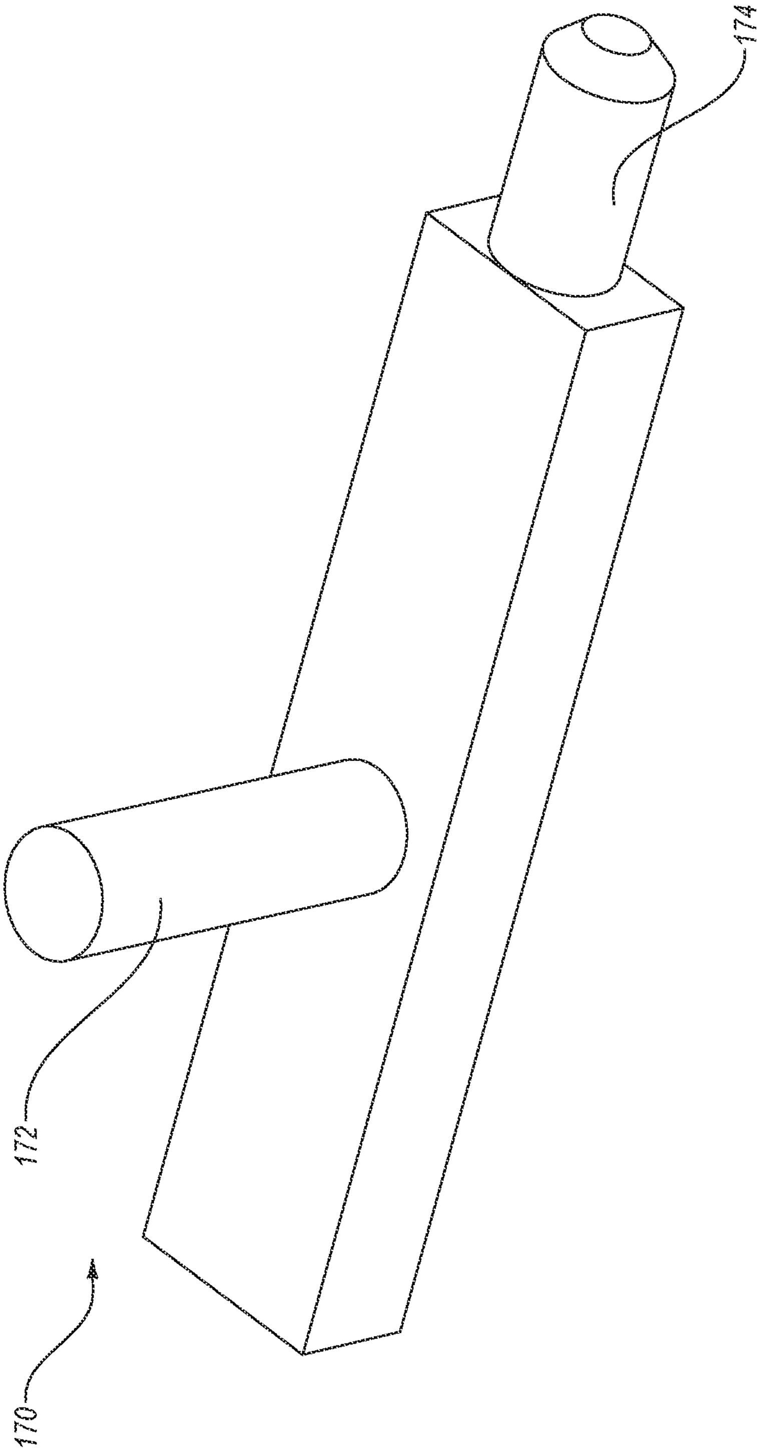
FIG. 7B illustrates a close-up view of the locking pin.

FIG. 7B illustrates a close-up view of the locking pin 170. In some embodiments, the locking pin 170 may include a body including an angular shape (e.g., a rectangular prism shape). The angular shape of the locking pin 170 may reduce and/or prevent vibrations and rotation of locking pin 170 when the locking pin 170 is engaged with the ratchet wheel opening 155 and/or disengaged from the ratchet wheel opening 155. In these and other embodiments, preventing and/or reducing vibrations and rotation of the locking pin 170 may reduce stress on the first locking arm 172.

Figure 7C:
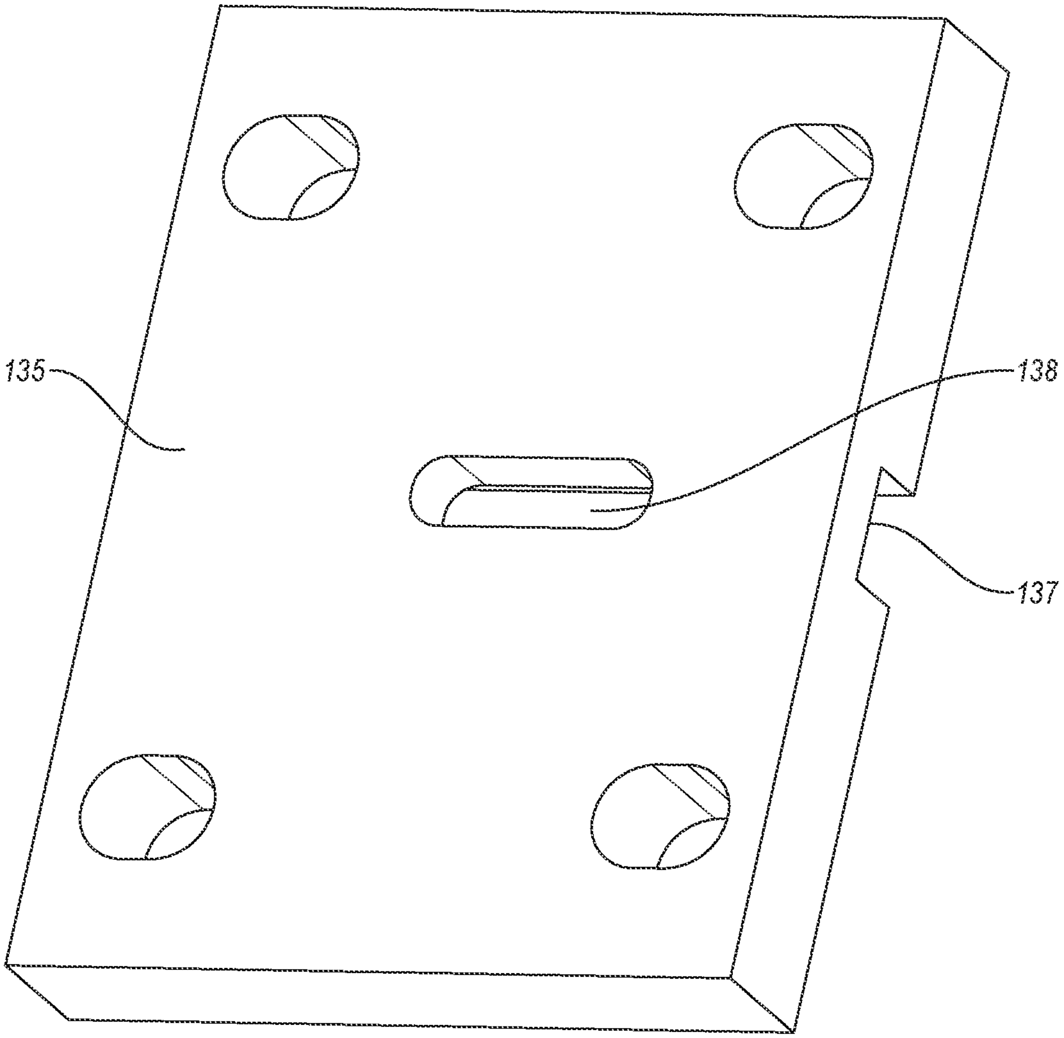
FIG. 7C illustrates a close-up view of the bearing-cap plate used in conjunction with the locking pin.

FIG. 7C illustrates a close-up view of the bearing-cap plate 135 used in conjunction with the locking pin 170. The channel 137 may include a cavity shape corresponding to the angular shape of the locking pin 170 to facilitate sliding movement of the locking pin 170 along the interior of the channel 137. Additionally or alternatively, the bearing-cap opening 138 may include a shape corresponding to the circumferential shape of the first locking arm 172 to further facilitate sliding movement of the locking pin 170 along the interior of the channel 137.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A mallet hammer tipping-detipping apparatus, comprising:
- a press weldment, the press weldment including a press base and a press neck extending from a surface of the press base;
- a press adapter coupled to the press neck, the press adapter including a central recess; and
- a tip holder coupled to the press base such that the press adapter is positioned above the tip holder, the tip holder including a seating section that includes a first seating surface having a flat surface and a second seating surface that includes a curved profile and interfaces with the first seating surface.

2. The mallet hammer tipping-detipping apparatus of claim 1, further comprising a rack block coupled to the press neck, wherein the rack block comprises:
- a rack gear coupled to the press adapter; and
- a spur gear interfacing with the rack gear such that rotation of the spur gear causes movement of the rack gear in a direction of the rotation.

3. The mallet hammer tipping-detipping apparatus of claim 2, wherein the rack block further comprises:
- a first rack block section;
- a second rack block section, wherein the rack gear is interposed between the first rack block section and the second rack block section; and a shaft extending through the first rack block section, the spur gear, and the second rack block section.

4. The mallet hammer tipping-detipping apparatus of claim 3, further comprising a ratchet wheel coupled to the press adapter, wherein the ratchet wheel includes:

one or more ratchet wheel openings perforating a surface of the ratchet wheel;

one or more ratchet wheel teeth;

a ratchet stop interfacing with the one or more ratchet wheel teeth; and a lever for engaging or disengaging the ratchet stop.

5. The mallet hammer tipping-detipping apparatus of claim 4, wherein the rack block further comprises:

a bearing-cap plate including a channel;

a locking pin arm positioned in the channel of the bearing-cap plate, the locking pin arm comprising a first locking arm configured to slide between a first end of the channel and a second end of the channel, and a second locking arm configured to interface with the one or more of the ratchet wheel openings, wherein:

being positioned at the first end of the channel disengages the second locking arm from the one or more ratchet wheel openings;

being positioned at the second end of the channel engages the second locking arm with the one or more ratchet wheel openings.

6. The mallet hammer tipping-detipping apparatus of claim 1, wherein the tip holder further comprises a base block capable of interfacing with the press base such that the tip holder is inclined relative to the press base when the base block interfaces with the press base.

7. The mallet hammer tipping-detipping apparatus of claim 6, wherein:

the press base includes a channel forming a grooved or indented shape in the press base; and the base block includes a protrusion extending from a surface of base block and including a shape that allows the protrusion to enter and interface with the grooved or indented shape of the channel in which the protrusion interfacing with the channel prevents lateral movement of the base block relative to the press base.

8. The mallet hammer tipping-detipping apparatus of claim 1, wherein the press adapter further comprises:

a first edge including a curved profile along a middle of the first edge; and one or more second edges including straight profiles, each of the one or more second edges including an indentation along a middle of each of the one or more second edges.

9. The mallet hammer tipping-detipping apparatus of claim 1, wherein the press weldment further comprises a strut reinforcement.

10. A method of installing a mallet hammer cap to a mallet hammer head, the method comprising:

positioning a first end of the mallet hammer head in a seating section of a tip holder;

positioning a second end of the mallet hammer head against a press adapter of a mallet hammer tipping-detipping apparatus, wherein the mallet hammer tipping-detipping apparatus comprises:

a press weldment, the press weldment including a press base and a press neck extending from a surface of the press base;

the press adapter coupled to the press neck, the press adapter including a central recess; and the tip holder coupled to the press base such that the press adapter is positioned above the tip holder, the tip holder including the seating section that includes a first seating surface having a flat surface and a second seating surface that includes a curved profile and interfaces with the first seating surface; and applying a downward pressure to the press adapter.

11. The method of claim 10, wherein the press adapter further comprises:

a first edge including a curved profile along a middle of the first edge; and one or more second edges including straight profiles, each of the one or more second edges including an indentation along a middle of each of the one or more second edges.

12. The method of claim 10, wherein the mallet hammer tipping-detipping apparatus further comprises a rack block coupled to the press neck, wherein the rack block comprises:

a rack gear coupled to the press adapter; and a spur gear interfacing with the rack gear such that rotation of the spur gear causes movement of the rack gear in a direction of the rotation.

13. The method of claim 12, wherein the rack block further comprises:

a first rack block section;

a second rack block section, wherein the rack gear is interposed between the first rack block section and the second rack block section; and a shaft extending through the first rack block section, the spur gear, and the second rack block section.

14. The method of claim 10, wherein the tip holder further comprises a base block capable of interfacing with the press base such that the tip holder is inclined relative to the press base when the base block interfaces with the press base, wherein:

the press base includes a channel forming a grooved or indented shape in the press base; and the base block includes a protrusion extending from a surface of base block and includes a shape that allows the protrusion to enter and interface with the grooved or indented shape of the channel in which the protrusion interfacing with the channel prevents lateral movement of the base block relative to the press base.

15. A method of removing a mallet hammer cap of a mallet hammer from a mallet hammer head of the mallet hammer, the method comprising:

positioning a lateral surface of the mallet hammer head against a seating section of a tip holder;

applying a downward pressure to a press adapter of a mallet hammer tipping-detipping apparatus positioned above the mallet hammer head, wherein the mallet hammer tipping-detipping apparatus comprises:

a press weldment, the press weldment including a press base and a press neck extending from a surface of the press base;

the press adapter coupled to the press neck, the press adapter including a central recess; and the tip holder coupled to the press base such that the press adapter is positioned above the tip holder, the tip holder including the seating section that includes a first seating surface having a flat surface and a second seating surface that includes a curved profile and interfaces with the first seating surface; and applying a pressure to a handle of the mallet hammer in a direction away from the mallet hammer tipping-detipping apparatus.

16. The method of claim 15, wherein the press adapter further comprises:

a first edge including a curved profile along a middle of the first edge; and one or more second edges including straight profiles, each of the one or more second edges including an indentation along a middle of each of the one or more second edges.

17. The method of claim 15, wherein the mallet hammer tipping-detipping apparatus further comprises a rack block coupled to the press neck, wherein the rack block comprises:

a rack gear coupled to the press adapter; and a spur gear interfacing with the rack gear such that rotation of the spur gear causes movement of the rack gear in a direction of the rotation.

18. The method of claim 17, wherein the rack block further comprises:

a first rack block section;

a second rack block section, wherein the rack gear is interposed between the first rack block section and the second rack block section; and a shaft extending through the first rack block section, the spur gear, and the second rack block section.

19. The method of claim 15, wherein the tip holder further comprises a base block capable of interfacing with the press base such that the tip holder is inclined relative to the press base when the base block interfaces with the press base, wherein:

the press base includes a channel forming a grooved or indented shape in the press base; and the base block includes a protrusion extending from a surface of base block and includes a shape that allows the protrusion to enter and interface with the grooved or indented shape of the channel in which the protrusion interfacing with the channel prevents lateral movement of the base block relative to the press base.

* * * * *